US005538807A

United States Patent [19]

Hagiuda

[11] Patent Number: 5,538,807
[45] Date of Patent: Jul. 23, 1996

[54] VENT VALVE FOR AN AMPHIBIOUS EQUIPMENT HAVING A BATTERY HOUSING

[75] Inventor: Nobuyoshi Hagiuda, Yokohama, Japan

[73] Assignee: Nikon Corporation, Tokyo, Japan

[21] Appl. No.: 113,341

[22] Filed: Aug. 30, 1993

[30] Foreign Application Priority Data

Sep. 3, 1992 [JP] Japan ................... 4-062134 U
Sep. 14, 1992 [JP] Japan ................... 4-064145 U

[51] Int. Cl.⁶ ...................................... H01M 2/10
[52] U.S. Cl. ........................... 429/100; 429/99
[58] Field of Search .................... 429/82, 89, 54, 429/55, 100, 99; 367/188

[56] References Cited

U.S. PATENT DOCUMENTS 5,258,242  11/1993  Dean et al. ................... 429/54

FOREIGN PATENT DOCUMENTS 56-115863 U   9/1981   Japan .
3-45535 U     4/1991   Japan .
3-86338 U     8/1991   Japan .
3-89429 U     9/1991   Japan .
3-89430 U     9/1991   Japan .
3-94531 U     9/1991   Japan .
4-70638 U     6/1992   Japan .
4-75330 U     7/1992   Japan .
4-77142 U     7/1992   Japan .
4-135742 U   12/1992   Japan .

*Primary Examiner*—John S. Maples

[57] ABSTRACT

A device usable in water includes a battery housing arranged in the device to house a battery, the battery housing having a common wall shared by an outer wall of the device, the common wall having an opening, a valve normally actuated by an actuation member to close the opening and opening the opening against the actuation member by a predetermined difference between a pressure in the battery housing and a pressure external of the equipment, and an air-permeable and liquid-impermeable filter arranged in the battery housing to cover the opening.

7 Claims, 6 Drawing Sheets

5,538,807

1

VENT VALVE FOR AN AMPHIBIOUS EQUIPMENT HAVING A BATTERY HOUSING

BACKGROUND OF THE INVENTION

1. Field of the Invention

The present invention relates to venting of equipment used in water, an amphibious waterproof equipment used on land and in water of up to several meters depth or waterproof equipment normally used on land, and more particularly to a vent valve provided between a battery housing arranged in the equipment and an outer wall of the equipment.

2. Related Background Art

An example of the vent valve is disclosed in Japanese Laid-Open Utility Model Application No. 56-115863 in which a vent valve is provided in a peripheral wall on battery housing of a land equipment rather than underwater equipment.

Where a vent valve is to be provided between a battery housing arranged in underwater equipment and an outer wall of the equipment, it is necessary to take into account a possibility of leak of water into the battery housing from a location external of the equipment through the vent valve. Since there is no known useful way, it has not been put into practice.

Where a battery is to be housed in the battery housing in the equipment, the following attention is to be paid. If the battery 1 is left for a long time while it is housed, electrolyte leaks from the battery and may ruin a battery circuit. In order to prevent this, the battery housing may be isolated to keep it in air tight, but if the battery generates heat, and the electrolyte therein is vaporized, gas of a high pressure is externally discharged by the vaporization. In the air tight state of the battery housing, a pressure in the housing rises by the discharged gas of the battery and the housing may break.

In order to avoid such a risk, a vent valve is required as disclosed in the above-mentioned Japanese Laid-Open Utility Model Application No. 56-115863. The pressure in the battery housing rises by the discharged gas of the battery and the vent valve is actuated by the pressure to allow the gas to be externally discharged through the vent valve. However, the vent valve disclosed in the above application is complex in structure and high in cost. Further, when the pressure in the battery housing abnormally rises and a large volume of gas is discharged all at once, it is a question whether the gas may be instantly discharged and there is a risk of break of the battery housing.

In an underwater equipment, when the vent valve is actuated and gas is externally discharged, that is, into water, water may penetrate into the battery housing through the vent valve which is open during venting, depending on the attitude of the equipment. As a result, parts such as the battery may be eroded or the electric circuit may be ruined.

SUMMARY OF THE INVENTION

It is a first object of the present invention to provide a vent valve for amphibious equipment which can safely vent gas in water and prevent leakage of water, even under a high water pressure.

It is a second object of the present invention to in expensively protect a battery housing from breaking, in water of up to several meters and on land.

2

In order to achieve the first object, as shown in FIG. 1, the present invention comprises an airtight battery housing (B) for an electric circuit provided in a piece of underwater equipment (A) housing the electric circuit, an opening (3c) for connecting the battery housing (B) to a location external of the underwater equipment (A) formed in a wall (3) integrally built in a portion of a peripheral wall of the underwater equipment (A) in a peripheral wall of the battery housing (B) including the wall (3), a movable valve (6a, 6b) arranged across a periphery of the opening (3c) of an outer wall of the underwater equipment (A) to the opening (3c), an actuation member (6c, 7) for applying an actuation force to the movable valve (6a, 6b) to move the movable valve from the outer wall of the underwater equipment (A) toward the battery housing (B) through the opening (3c), an elastic seal member (4) held between the peripheral portion (3) of the opening (3c) and the movable valve (6a, 6b) for keeping the-battery housing (B) waterproof and airtight to the external of the underwater equipment (A), a first vent valve (6a, 6b, 7, 4) for discharging gas in the battery housing (B) to the external of the underwater equipment (A) through the actuation member (6c, 7) and the elastic seal member (4) by the actuation of the movable valve (6a, 6b) against the actuation force of the actuation member (6c, 7), and a second vent valve (11) including an air-permeable and liquid-impermeable filter (11) provided at a peripheral portion (3a) of the opening (3c) of the peripheral wall of the battery housing (B).

The wall (3) of the peripheral wall of the battery housing (B) which is shared with the peripheral wall of the underwater equipment is a sealing lid (3) for sealing the battery housing (B) in FIG. 1, although the present invention is not limited to the sealing lid.

The portion (6a) of the movable valve (6a, 6b) which is located on the outer wall of the underwater equipment (A) is covered by a cap (5) which protects 1 the movable valve (6a, 6b) from an external shock. It is not necessarily provided in the present invention.

The elastic seal (4) is held between the peripheral portion (3) of the opening (3c) of the underwater equipment (A) and the movable valve (6a, 6b) to keep the battery housing (B) waterproof and airtight to the external of the underwater equipment (A), and the actuation member (6c, 7) applies the actuation force to the movable valve (6a, 6b) to move it from the outer periphery of the underwater equipment (A) toward the battery housing (B) through the opening (3c). As a result, the following operations are attained.

The movable valve (6a, 6b) is not floated by the actuation force under the attitude of the equipment (A), and the movable valve (6a, 6b) is pushed into the equipment (A) by the action of a water pressure $P_1$ and the elastic seal member (4) is tightly contacted to the peripheral portion (3) of the opening (3c) and the movable valve (6a, 6b) so that the battery housing (B) of FIG. 1 is perfectly sealed and no water droplet passes through the opening (3c) and the leak of water into the battery housing (B) is prevented.

The air-permeable and liquid-impermeable filter (11) is provided as the second vent valve at the portion (3a) of the peripheral wall of the battery housing (B) of FIG. 1 which is located around the opening (3c). Since the filter (11) does not pass liquid but passes only gas, the following operations are attained.

If the battery generates heat by any reason and discharges gas, to raise a pressure in the housing (B), the gas passes through the air-permeable and liquid-impermeable filter (11), even in the water, and the movable valve (6a, 6b) is moved toward the external (water) of the equipment (A) by the gas pressure against the activation force, and a clearance is created between it and the elastic seal member (4) by the movement, as shown in FIG. 3. The gas in the battery housing (B) is discharged to the external (water) of the equipment (A) through the air-permeable and liquid-impermeable filter (11) and the clearance created between the movable valve and the elastic seal member by the movable valve (6a, 6b), and the pressure in the battery housing (B) is lowered by the discharge to protect the housing (B).

During the discharge of the gas, a water droplet may pass through the clearance but is blocked by the air-permeable and liquid-impermeable filter (11) so that the water droplet does not enter into the battery housing (B) and the erosion of the battery is prevented.

Accordingly, the vent valve for underwater equipment which permits safe venting of gas in the water and prevents the leak of water even under a high water pressure.

In order to achieve the second object, as shown in FIGS. 4 and 5, the present invention comprises an airtight battery housing (21a) for an electric circuit in a piece of waterproof equipment housing the electric circuit, an opening (23a) formed in a common part (23) shared by a portion of a peripheral wall of the waterproof equipment (21) in a peripheral wall of the battery housing including the common part (23), an air-permeable and liquid-impermeable filter (27), a hold member (25, 26) for holding the air-permeable and liquid-impermeable filter (27) for protecting the air-permeable and liquid-impermeable filter (27), secure/detach means (23d, 25e) for securing the hold member (25, 26) to the peripheral part (23) of the opening (23a) of the waterproof equipment (21) together with the air-permeable and liquid-impermeable filter (27) when the hold member (25, 26) covers the opening (23a) while it keeps the holding of the air-permeable and liquid-impermeable filter (27) and detaching the hold member (25, 26) from the peripheral part of the opening (23a) of the waterproof equipment (21) together with the air-permeable and liquid-impermeable filter, and a vent hole (25a, 26a) formed at a portion of the hold member which holds the air-permeable and liquid-impermeable filter (27).

The common part (23) of the peripheral wall of the battery housing (21a) which is shared by a portion of the peripheral wall of the waterproof equipment (21) is a sealing lid (23) for sealing the battery housing (21a) in FIG. 4 although the present invention is not limited to the sealing lid (23) in FIG. 4.

Since the air-permeable and liquid-impermeable filter (27) held by the hold member (25, 26) does not pass the liquid and passes only the gas, the following operation is attained.

In the water of up to several meters depth and on land, even if a water droplet attempts to penetrate from the external of the waterproof equipment (21) through the vent hole (25a, 26a) of the hold member (25, 26) of FIG. 4, it is blocked by the air-permeable and liquid-impermeable filter (27) so that no water droplet penetrate into the battery housing (21a) in the equipment (21) and the battery is protected. Accordingly, the battery housing is not broken and it is protected.

If the battery (28a) housed in the battery housing (21a) generates heat by any reason and the battery (28a) discharges gas to raise a pressure in the battery housing (21a), the gas is discharged to the external of the waterproof equipment (21) against an atmospheric pressure on land or a water pressure in water through the vent hole (25a, 26a) formed in the hold member (25, 26) holding the air-permeable and liquid-impermeable filter (27) as shown in FIG. 4 so that the pressure in the battery housing (21a) is lowered to prevent the break of the housing (21a).

Where a large volume of gas discharged from the battery is to be discharged at a time, the pressure in the battery housing (21a) exceeds a predetermined level and the hold member (25, 26) and the air-permeable and liquid-impermeable filter (27) are detached from the peripheral part (23) of the opening (23a) by the secure/detach means (23d, 25e) against the air pressure and the water pressure around-the equipment so that the opening (23a) is opened and the large volume of gas can be discharged instantly to the external of the equipment (21) through the opening (23a).

On land, the pressure in the battery housing (21a) is lowered by the discharge of the gas so that the break of the housing (21a) is prevented. In water, water may penetrate into the battery housing (21a) through the opening (23a) when the gas is discharged but the housing (21a) can be protected because the battery housing (21a) is not broken due to the discharge of the gas to the external of the equipment.

Since only the hold member (25, 26) and the air-permeable and liquid-impermeable filter (27) are required, the construction is simple and the cost is reduced.

In this manner, the objects of the present invention are achieved.

DETAILED DESCRIPTION OF THE PREFERRED EMBODIMENTS

An embodiment of the present invention is explained.

Figure 1:
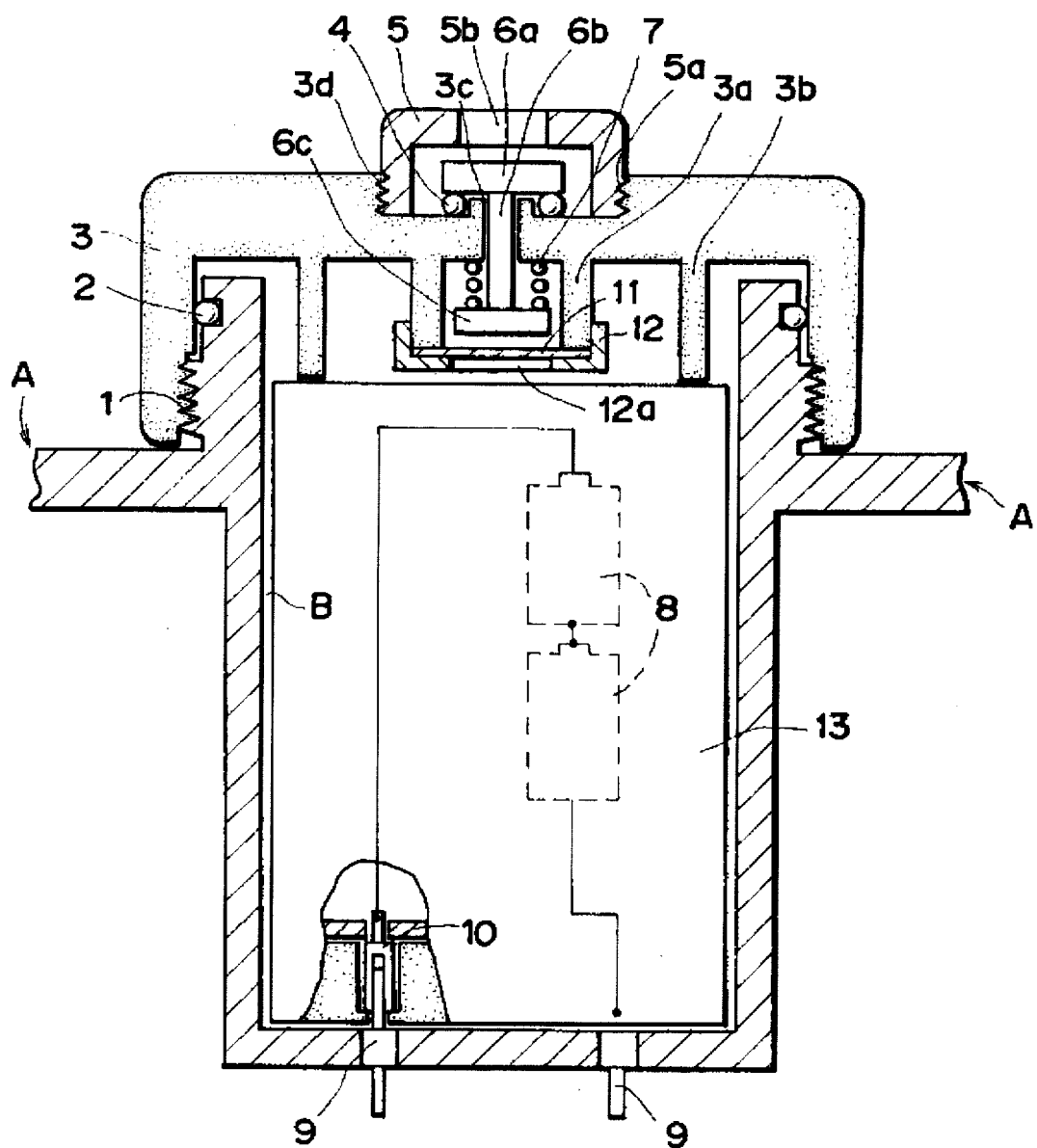
FIG. 1 shows a sectional view of a vent valve mounted on a piece underwater equipment in accordance with an embodiment of the present invention.

FIG. 1 shows a sectional view of a state when a vent valve provided at a wall part 3 of a peripheral wall of a battery housing B which is shared with a portion of a peripheral wall of an underwater equipment A.

In FIG. 1, the wall part 3 provided with the vent valve is a sealing lid removably arranged on the peripheral wall of the underwater equipment A to seal the battery housing B. An opening 3c is provided in the lid 3. A valve shaft 6b is loosely coupled to the opening 3c and disks 6a and 6c are attached to the opposite ends of the valve shaft 6b. The disk 6a located on an outer wall of the sealing lid 3 forms a movable valve with the valve shaft 6b.

An elastic ring 4 is held between a periphery of the opening 3c of the outer wall of the sealing lid 3 and the disk 6a and is used as an elastic sealing member.

A coiled spring 7 is held between an inner wall of the sealing lid 3 and the disk 6c around the valve shaft 6b. The coiled spring 7 forms an actuation member to apply an actuation force to the movable valves 6a and 6b to move them toward the battery housing B by the coiled spring 7 and the disk 6c. The movable valves 6a and 6b, the elastic sealing member 4 and the actuation members 6c and 7 form the first vent valve.

A hollow cylinder 3a is arranged around the opening 3c of the inner wall of the lid 3. The disk 6c is arranged on the inner peripheral surface of the hollow cylinder 3a with a clearance. An air-permeable and liquid-impermeable filter 11 is secured to an end of the hollow cylinder 3. The air-permeable and liquid-impermeable filter 11 is secured by a retainer ring 12. An opening 12a is formed at a portion of the retainer ring 12 facing an inner cavity of the hollow cylinder 3a through the filter 11.

The air-permeable and liquid-impermeable filter 11 is used as the second vent valve and it is made of a finely woven cloth using special fine fibers. A material having a molecule structure which is larger than a stitch cannot pass therethrough but a material smaller than the stitch can pass therethrough. The filter 11 used in the present invention has a characteristic that it does not pass a larger molecule such as a water molecule but passes a smaller gas molecule.

A male thread 5a of a protection cap 5 meshes with a female thread 3d of the sealing lid 3. The protection cap 5 protects the movable valve from an external shock. An opening 5b is provided at a top of the cap 5 to discharge gas from the equipment A when the protection cap is used in water.

A battery pack 13 which houses a battery 8 is housed in the battery housing B. After the pack 13 is housed, a female thread of the sealing lid 3 is meshed with a male thread 1 of the equipment A through a waterproof ring 2. The battery housing B is sealed by the mesh and the battery pack 13 is secured to the housing B without play by a rib 3b formed in the inner wall of the lid 3.

The battery pack 13 may house any number of batteries. The battery may be a commercially available battery cell or a rechargeable secondary battery. In the present invention, the battery pack 13 may not be used but the battery may be directly housed in the battery housing B.

Electrodes 9 (at least two) for receiving power output terminals 10 (at least plus and minus power supply terminals) of the battery pack 13 are built in the inner wall of the battery housing B. The electrodes 9 are assembled in the battery housing B without clearance by an insert molding method or a waterproof shaft structure using pressure insertion or an O-ring so that gas does not leak to the periphery of the battery housing B, even if the pressure in the battery housing B rises. The electrodes 9 are electrically connected to a circuit (not shown) in the equipment through wires to feed a power to the circuit.

In case the battery discharges inflammable gas for any reason, the connection between the power output terminals 10 of the battery pack 13 and the electrodes 9 is made by a structure of encompassing pins by a resilient socket. The contacts of the pins is made not at a point but by multiple points. As a result, even if the battery pack 13 is moved by vibration, the connection is not lost and no arc is produced. Accordingly, there is no risk of firing of the inflammable gas.

When the sealing lid 3 is to be removed from the equipment A, the electrodes 9 and the power output terminals 10 of the battery pack 13 are kept connected while the lid 3 is opened and the internal gas is replaced with the external air. Accordingly, no arc is produced and breakage of the battery housing B does not occur.

Figure 2:
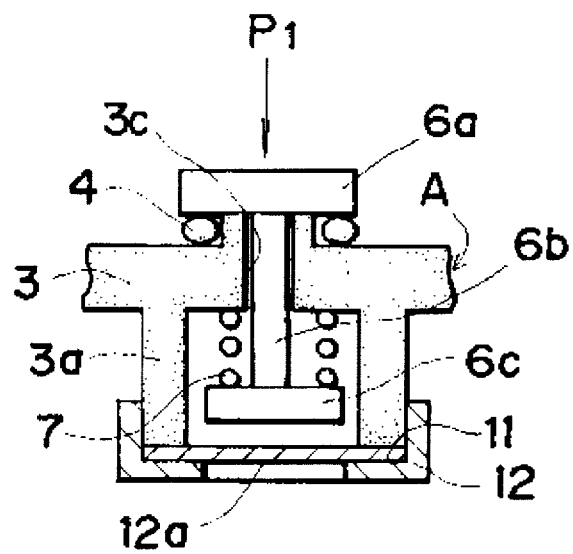
FIG. 2 shows a sectional view illustrating a state of the vent valve when a water pressure $P_1$ acts thereon.
Figure 3:
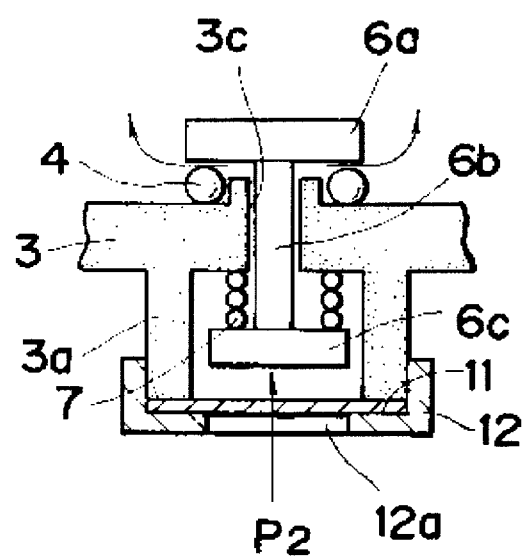
FIG. 3 shows a sectional view illustrating an open state of the vent valve by a pressure $P_2$ in the battery housing when the pressure $P_2$ abnormally rises over a predetermined level.

An operation of the vent valve is now explained. Even if the equipment A is placed in water, the movable valves 6a and 6b do not float in the water because the movable valves 6a and 6b are pulled toward the battery housing B by the actuation force of the actuation members 6c and 7 of FIG. 1 and the water pressure $P_1$ acts on the portion 6a of the movable valves 6a and 6b as shown in FIG. 2 so that the movable valves 6a and 6b are pushed in. As a result, the elastic ring 4 is tightly contacted to the portion 6a and the outer wall of the lid 3 and the opening 3c is sealed to prevent the leak of water into the equipment.

Further, since the actuation members 6c and 7 pull the movable valves 6a and 6b inwardly of the equipment A, the movable valves 6a and 6b are not actuated by the pressure rise in the battery housing even if the battery temperature rises in a normal temperature range.

If the electric circuit of the equipment A shorts and an excess current continuously flows and the temperature in the battery 8 abnormally rises and gas is generated from the battery 8 through the battery pack 13 and the pressure $P_2$ in the battery housing B abnormally rises, the movable valves 6a and 6b are pushed outwardly of the equipment A by the pressure $P_2$ in the battery housing through the opening 12a of the retainer ring 12 and the air-permeable and liquid-impermeable filter 11. As a result, a clearance is created between it and the elastic ring 4 and the gas in the battery housing is discharged external (water) of the equipment A.

The gas is discharged external (water) of the equipment A through the clearance between the inner periphery of the hollow cylinder 3a, as shown in FIG. 2 and the disk 6c, the clearance between the periphery of the valve shaft 6b and the opening 3c and the clearance between the elastic ring 4 and the disk 6a so that the pressure in the battery housing falls to prevent the break of the battery housing B.

Water also penetrates into the equipment A from external (water) of the equipment A through the same clearances. The leakage is only small amount like water droplet which stays in the inner cavity of the hollow cylinder 3a by the air-permeable and liquid-impermeable filter 11 so that it does not penetrate into the battery housing B in the equipment A. Thus erosion of the battery is prevented.

In order to remove the water droplet penetrated into the inner cavity of the hollow cylinder 3a, the disk 6a is pulled out of the equipment A on land and the water droplet is drained off through the clearance. Dry gas is flown into the equipment A from the battery housing B through the filter 11 so that the water droplet is completely drained off. A knob to permit to pull out the disk 6a may be provided to facilitate the manipulation.

In accordance with the present embodiment, even if the gas discharged from the battery is inflammable, there is no risk of firing by constructing the electrical connection in the battery housing in the manner shown by the power supply terminals 10 and the electrodes 9 and the penetration of gas into the equipment from the battery housing does not occur by constructing the battery housing in airtight.

Further, since only a small water droplet penetrates into the hollow cylinder 3a, when the gas is discharged from the equipment A to the water, there is no risk of the break of the air-permeable and liquid-impermeable filter 11 by the water droplet.

Since the equipment is used in water, the movable valves 6a and 6b, the disk 6c and the lid 3 are preferably made of an anti-erosion material such as stainless steel or plastic resin.

In accordance with the present embodiment, the movable valves are not floated by the actuation member whether the water depth is high or low and the portion of the movable valves located externally of the equipment is pushed toward the wall plane of the equipment by the water pressure so that the opening is closed and the leak of water into the battery housing is prevented.

If the pressure in the battery housing abnormally rises by the discharged gas of the battery itself, the gas is discharged external of the underwater equipment by the movable valve so that the battery housing is protected. In this case, the water droplet does not penetrate into the battery housing in the equipment because of the air-permeable and liquid-impermeable and the leak of water is prevented even under a high pressure.

Figure 4:
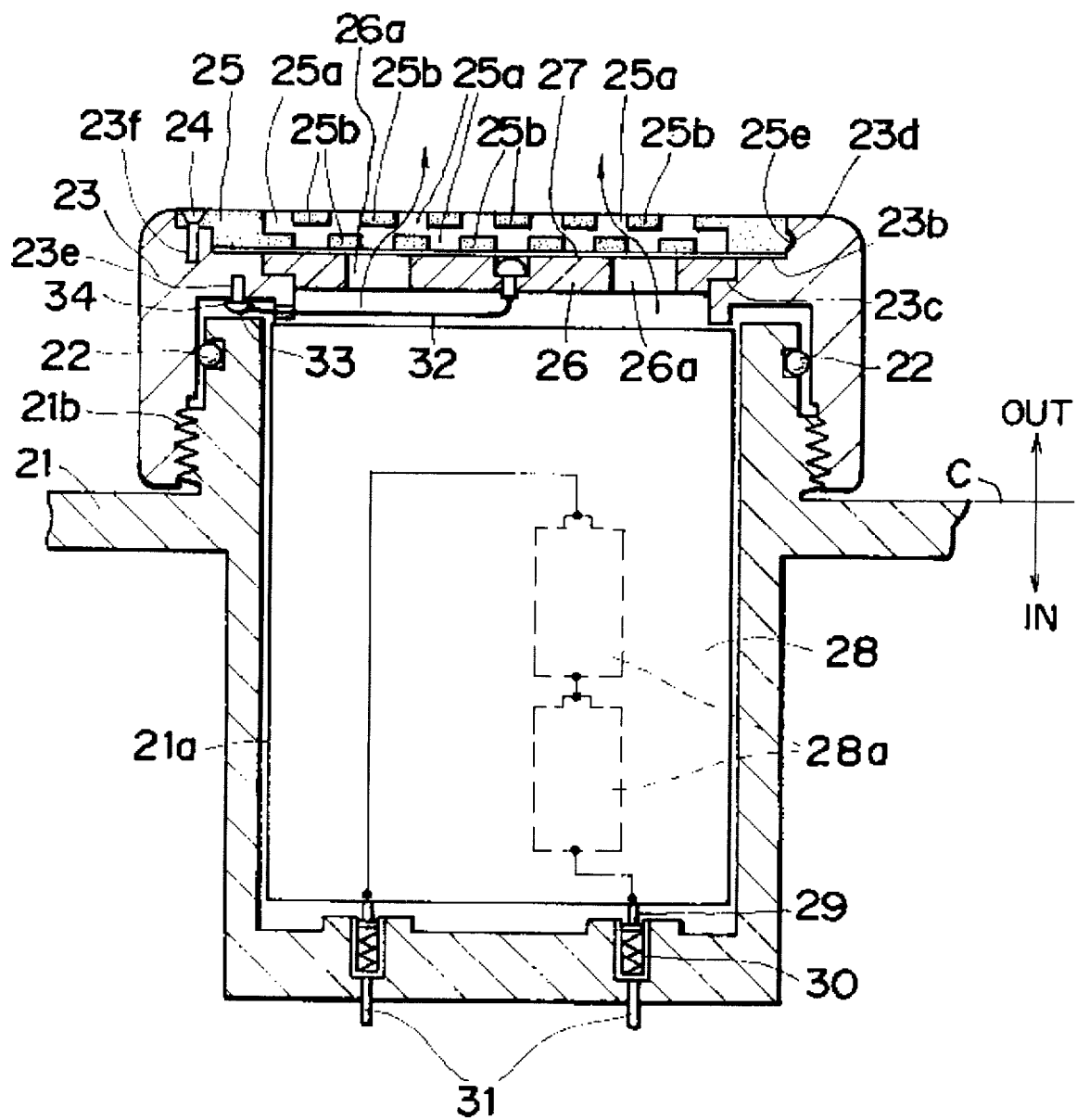
FIG. 4 shows a sectional view illustrating a state when a vent valve is provided at a common part of a peripheral wall of the battery housing which is shared by a portion of a peripheral wall of a waterproof equipment in accordance with another embodiment of the present invention.

FIG. 4 shows a sectional view of another embodiment of the present invention. An out side of a border line C, located on an outer wall of a waterproof equipment 21, shows an exterior of the equipment 21 and an in side shows an interior of the equipment 21.

Figure 5:
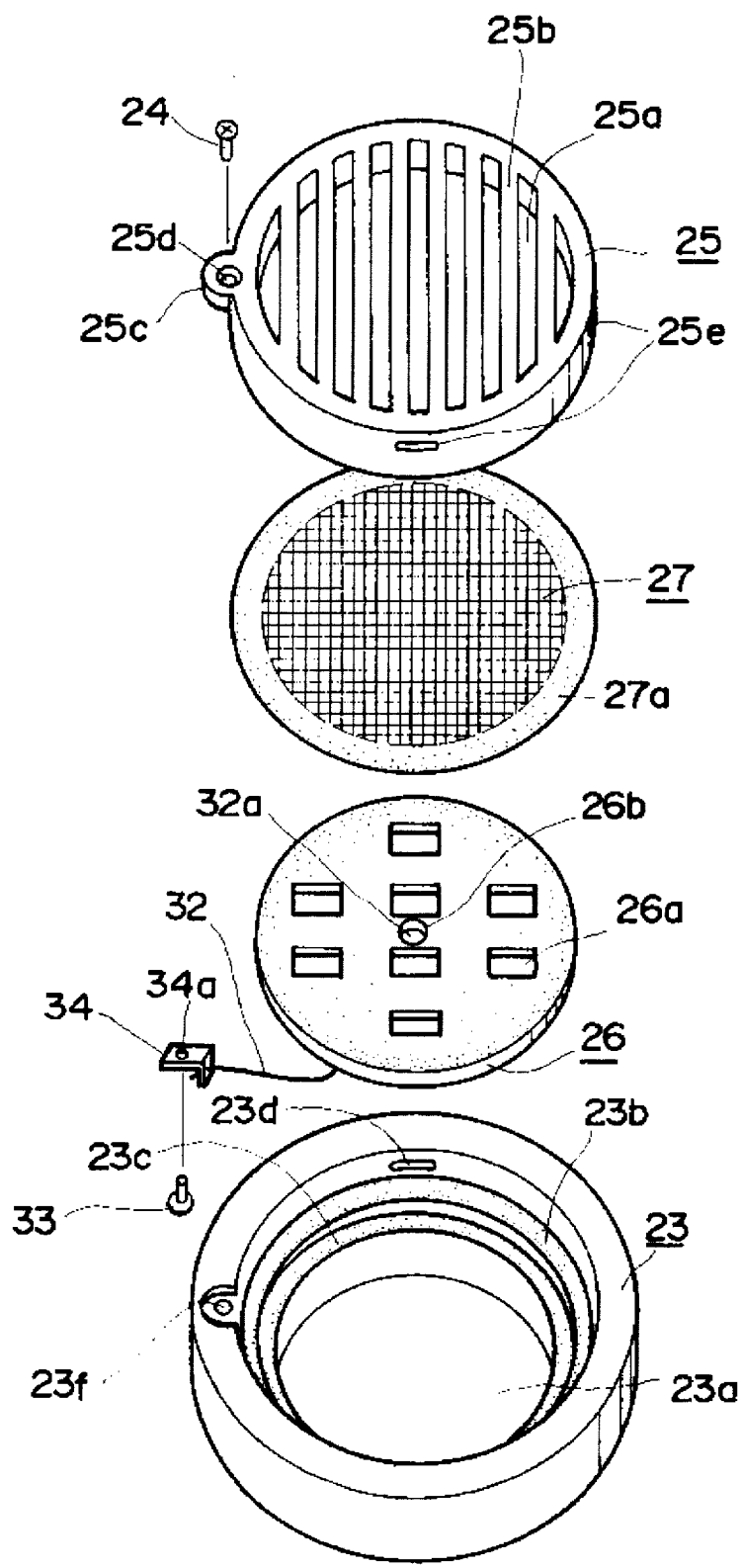
FIG. 5 shows a developed perspective view of parts of the vent valve of FIG. 4.

In FIG. 4, a lid for sealing a battery housing 21a of the waterproof equipment 21 meshes with a male thread 21b of the waterproof equipment 21 and parts 25, 26 and 27 are provided on the top of the lid 23 as shown in FIG. 5.

As shown in FIG. 5, an opening 23a is provided in the lid 23 and ring-shaped steps 23b and 23c are formed in the periphery of the opening 23a. The part 25 is a retainer cap and vent holes 25a and blocking areas 25b are alternately arranged in an elongated shape on the top of the cap 25. The vent holes 25a and the blocking areas 25b are also formed on the bottom of the cap 25 as shown in FIG. 4 (not shown in FIG. 5) in a complementary relation with the vent holes 25a and the blocking areas 25b on the top.

A fitting hole 25d to be fitted by a screw 24 is formed at a projection 25c on a lefthand of the drawing formed integrally with the cap 25 in the periphery of the retainer cap 25 of FIG. 5. A plurality of engaging projections 25e are formed on the periphery of the retainer cap 25 and a number of (only one is shown) engaging recesses 23d are formed on the inner periphery of the lid 23 to correspond to the projections 25e. The projections and recesses 23d and 25e form the secure/detach means.

The part 26 is a hold plate which has a number of rectangular vent holes 26a formed therein and forms the hold plate for holding the air-permeable and liquid-impermeable filter 27 together with the retainer cap. One end 32a of a rope 32 is connected to a center 26b of the hold plate 26 and the other end of the rope 32 is connected to a member 34.

A fitting hole 34a, to be fitted by a screw 33, is formed in the member 34. The screw 33 is fitted to the hole 34a to be meshed with the female thread 23e of FIG. 4 formed on the bottom of the lid 23. A female thread 23f to .be meshed with the screw 24 through the fitting hole 25d of the retainer cap 25 is formed on the top of the lid 23.

The air-permeable and liquid-impermeable filter 27 is made of a finely woven cloth using special fine fibers. A material having a larger molecule structure than the stitch cannot pass therethrough but a material smaller than the stitch can pass therethrough. Accordingly, the air-permeable and liquid-impermeable filter 27 used in the present invention has a characteristic that it does not pass a larger molecule such as a water molecule, but passes a smaller molecule of gas. A contact plane 27a for abutting against a ring-shaped bottom of the retainer cap 25 is provided around the air-permeable and liquid-impermeable filter 27.

Both planes of the air-permeable and liquid-impermeable filter 27 are held by the retainer cap 25 and the hold plate 26 and the air-permeable and liquid-impermeable filter 27 is inserted into the opening 23a of the lid 23. In this case, the member 34, see FIG. 5 is previously moved to the bottom of the lid 23 through the opening 23a of the lid 23 and the screw 33 is threaded to the female thread 23e of the lid 23 of FIG. 4 through the fitting hole 34a of the member 34. Then, bonding material is applied to the step 23c of the lid 23 of FIG. 5 and the periphery of the hold plate 26 is bonded to the step 23c of the lid 23 by the bonding material. Further, bonding material is applied to the top plane of the hold plate 26, excluding the vent hole 26a, and the step 23b of the lid 23 and the air-permeable and liquid-impermeable filter 27 is bonded.

Following the above bonding, bonding material is applied to the contact plane 27a of the air-permeable and liquid-impermeable filter 27 and the retainer cap 25 is inserted. The engaging projection 25e of the cap 25 is engaged with the recess 23d of the lid 23 and the ring-shaped bottom of the cap 25 is bonded to the contact plane 27a of the air-permeable and liquid-impermeable filter 27. Thereafter, the screw 24 is threaded to the female thread 23f of the lid 23 through the fitting hole 25d of the cap 25.

Through the engagement of the engaging recess 23d and the projection 25e, the retainer cap 25 and the hold plate 26 are secured around the opening 23a of the lid 23 while they hold the air-permeable and liquid-impermeable filter 27 therebetween. Gas and liquid do not pass through the areas bonded by the bonding material (such as the contact plane 27a) and the vent is conducted only through the air-permeable and liquid-impermeable filter 27 via the vent holes 25a and 26a of the retainer cap 25 and the hold plate 26. Thus, liquid is blocked by the air-permeable and liquid-impermeable filter 27 so that the penetration of the liquid is prevented. The retainer cap 25, the air-permeable and liquid-impermeable filter 27 and the hold plate 26 of FIG. 4 form the vent valve of the waterproof equipment.

In FIG. 4, a battery pack 28 housing a battery 28a is housed in a battery housing 21a of the waterproof equipment. The battery pack 28 may be a commercially available battery or a specially designed battery.

Lead electrodes (at least plus and minus electrodes) 31 are secured to a peripheral wall of the battery housing 21a and connecting terminals 29 to be connected with electrodes of the battery pack 28 and springs 30 are provided for the lead electrodes 31. The battery pack 28 supplies a power to an electric circuit (not shown), located externally of the battery housing 21a, through the connecting terminals 29, the springs 30 and the lead electrodes 31.

The lead electrodes 31 are inserted into the peripheral wall of the battery housing 21a without forming a clearance by an insert molding method, a press insertion method or a waterproof shaft structure using an O-ring so that no gas or electrolyte leaks out of the peripheral wall of the battery housing 21a even if the pressure in the battery housing 21a rises. As a result, the electric circuit (not shown) is protected. The battery housed in the battery pack 28 may be loaded by a user of the equipment.

An operation of the construction shown in FIG. 4 is now explained.

In water of up to several meters depth or on land, when a water droplet attempts to penetrate into the equipment 21 from the external thereof, the penetration of the water droplet into the battery housing 21a is blocked by the air-permeable and liquid-impermeable filter 27 of FIG. 4 so that the battery 28a and the pack 28 in the battery housing 21a are protected. The hold plate 26 may have a function of resisting to the water pressure by transmitting the water pressure applied to the air-permeable and liquid-impermeable filter 27 to the step 23c of the lid 23.

If gas is discharged from the battery 28a to the external through the battery pack 28 by any reason, the pressure in the battery housing 21a rises by the discharge and a force to pushing up the hold plate 26 in FIG. 4 acts, and push-up forces also act on the air-permeable and liquid-impermeable filter 27 and the retainer cap 25.

Where those push-up forces are weaker than the engaging forces of the engaging members 23d and 25e, the gas discharged from the battery 28 is discharged to the external through the vent hole 26a of the hold plate 26 of FIG. 4, the air-permeable and liquid-impermeable filter 27 and the vent hole 25a of the retainer cap 25 against the air pressure or water pressure surrounding the equipment 21 so that the pressure in the battery housing 21a is lowered and the break of the battery housing 21a is prevented.

When a large volume of gas is discharged at a time, the pressure in the battery housing 21a may exceed a predetermined level and the forces to push up the parts 25, 26 and 27 may become stronger than the engagement forces of the engaging members 23d and 25e. In this case, the engagements of the engaging members 23d and 25e are disengaged and the retainer cap 25 is disengaged from the opening 23a of the lid 23 as shown in FIG. 6.

Figure 6:
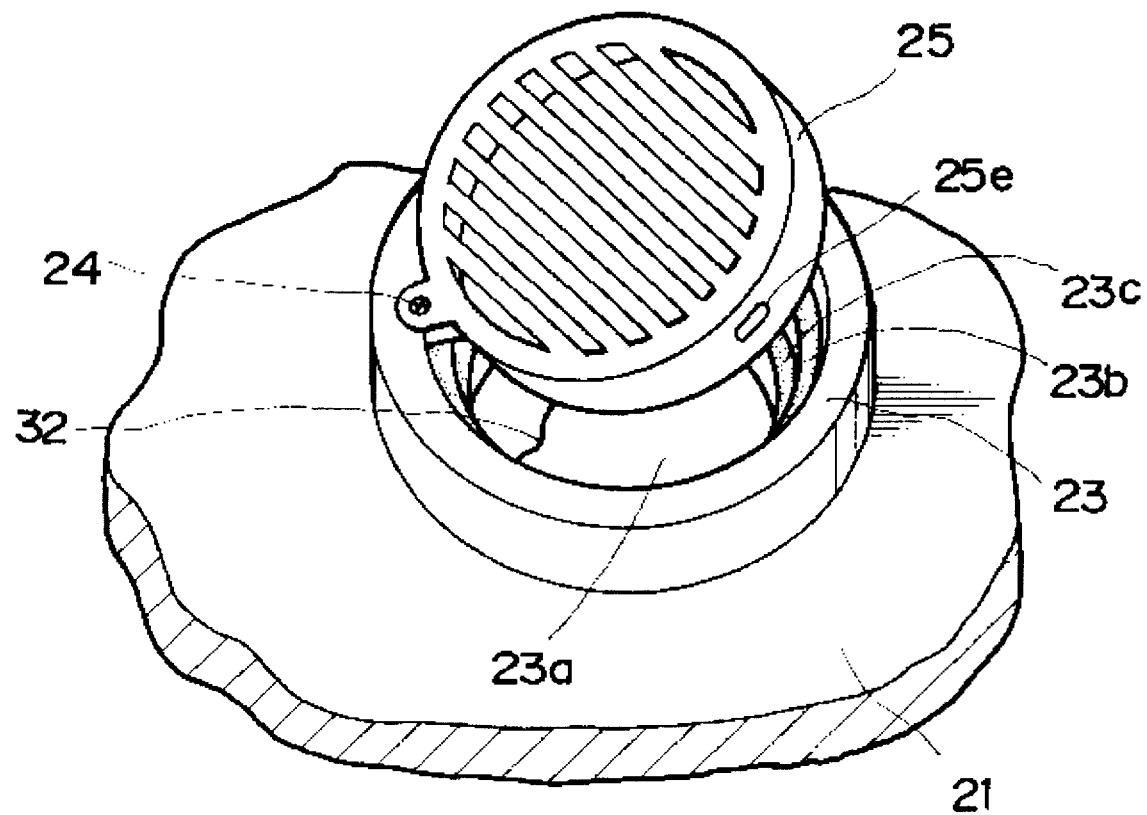
FIG. 6 shows a state when the vent valve is detached by a pressure in the battery housing.

The air-permeable and liquid-impermeable filter 27 and the hold plate 26 are not shown in FIG. 6. In mounting the parts 26 and 27 on the opening 23a, the hold plate 26 is previously bonded to the air-permeable and liquid-impermeable filter 27 by bonding material and the contact plane 27a of the air-permeable and liquid-impermeable filter 27 is bonded to the ring-shaped bottom of the retainer cap 25 by bonding material. As a result, the retainer cap 25 of FIG. 6 is disengaged from the opening 23a integrally with the air-permeable and liquid-impermeable filter 27 and the hold plate 26 so that the opening 23a is opened and a large volume of gas can be discharged to the external instantly.

Figure 7:
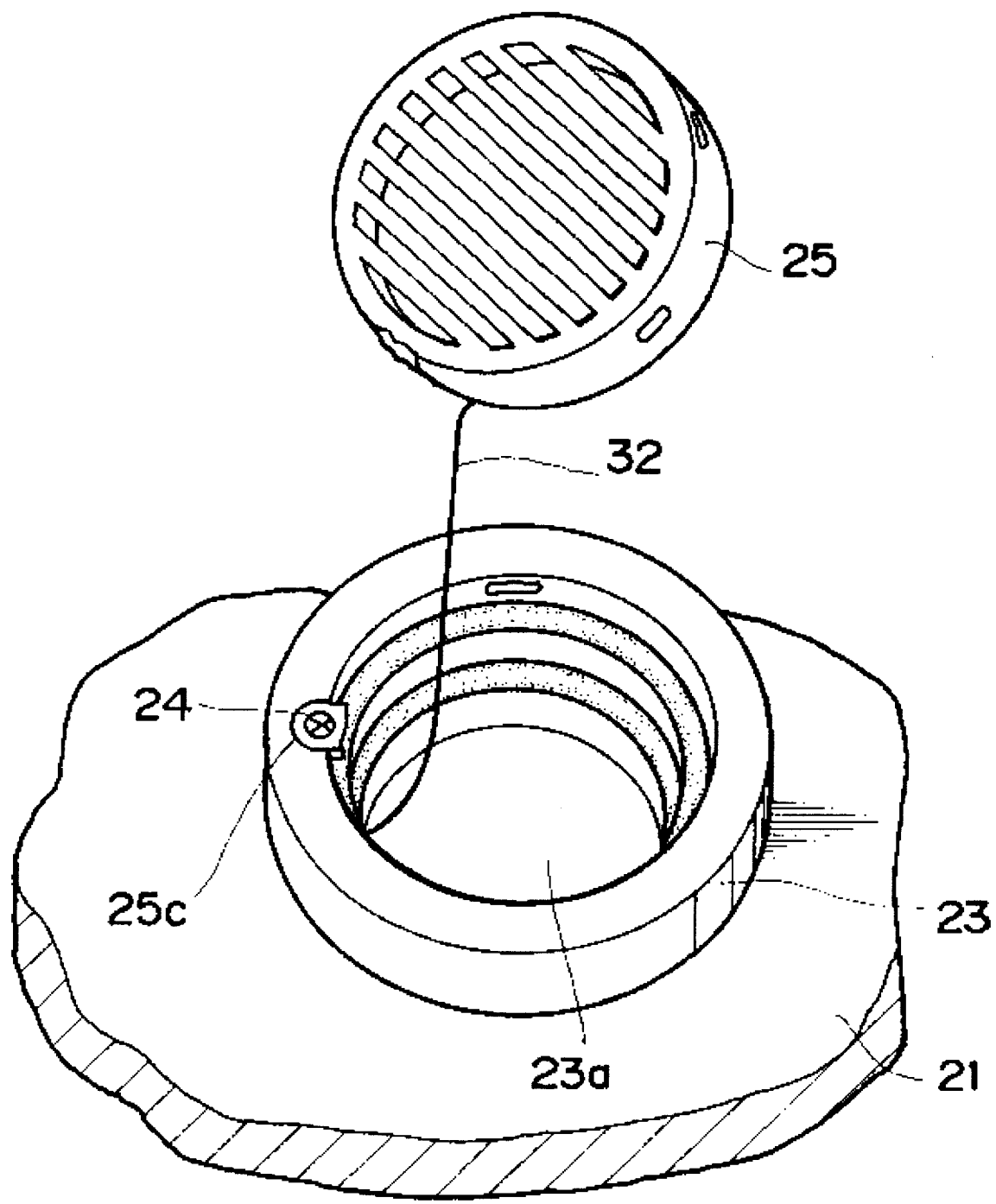
FIG. 7 shows a state when the vent valve is partially broken and detached by the pressure in the battery housing.

In water, when the opening 23a is opened and a large volume of gas is discharged at a time, water penetrates into the battery housing 21a through the opening 23a when the gas is discharged, but the battery housing 21a is not broken because of the discharge of the gas to the external and the battery housing 21a can be protected. Further, since the battery housing 21a is waterproof and airtight to the peripheral electric circuit, there is no risk of the leak of water to the peripheral electric circuit by the water penetration and the electric circuit can be protected. When the volume of the gas discharged from the battery 28 in the battery housing 21a further increases and the forces to push up the parts 25, 26 and 27 further increase. Thereafter, the engagements of the engaging members 23d and 25e are disengaged and the retainer cap 25 is broken by the projection 25c of the retainer cap 25 through the screw 24 as shown in FIG. 7. The cap 25 is disengaged from the opening 23a together with the air-permeable and liquid-impermeable filter 27 and the hold plate 26 and the opening 23a is opened as it is in FIG. 6. As a result, the large volume of gas can be discharged to the external instantly.

In FIG. 7, a rope 32 prevents the part 25 (and the parts 26 and 27 not shown) from being flown away from the equipment 21 to minimize a danger.

If retainer cap 25 is not broken from the projection 25c as shown in FIG. 6 when the retainer cap 25 is disengaged from the opening 23a, the rope 32 may not be used.

In accordance with the present embodiment, since the battery housing 21a is waterproof and airtight to the peripheral electric circuit, the peripheral electric circuit is not broken even if the electrolyte leaks from the battery and the damage is minimized, that is, only to remove the electrolyte from the battery housing.

In the present embodiment, the engaging recess 23d and projection 25e of FIG. 4 are used as the secure/detach means. In the present invention, the engaging recess 23d and projection 25e are not necessarily be used but the bonding material may be used as the secure/detach means. In this case, the retainer cap 25 and the hold plate 26 of FIG. 4 are secured together with the air-permeable and liquid-impermeable filter 27 to the periphery of the opening 23a of the sealing lid 23 by the bonding material. Thus, the parts 25, 26 and 27 are prevented from being disengaged from the equipment 21 so long as the pressure in the battery housing 21a does not exceed the predetermined level.

If the volume of gas discharged from the battery 28 is large and the pressure in the battery housing 21a exceeds the predetermined level, the forces (pressure) to push up the parts 25, 26 and 27 become stronger than the bonding force of the bonding material and the retainer cap 25 and the hold plate 26 are torn off the periphery of the opening 23a together with the air-permeable and liquid-impermeable filter 27. Through the tear-off, the opening 23a is opened and the large volume of gas can be discharged to the external instantly. As a result, the battery housing 21a is protected.

An alkaline indicator such as a PH reagent may be impregnated in the air-permeable and liquid-impermeable filter 27 so that when the electrolyte of the battery 28 leaks, a color of the air-permeable and liquid-impermeable filter 27 changes by the electrolyte and the user may detect the change of color to confirm the leak of the electrolyte of the battery 28. The leaked liquid from an alkaline cell or a Ni-Cd cell exhibits strong alkaline property and the contacts in the battery housing may be eroded by the leaked liquid. By monitoring the change of color of the air-permeable and liquid-impermeable filter, the user may wipe off the leaked liquid to immediately take an action against the erosion.

In accordance with the present embodiment, the gas discharged from the battery may be discharged to the external through the air-permeable and liquid-impermeable filter and the vent hole of the retainer member even in water of up to several meters and on land so that the break of the battery housing is prevented.

Further, even if a large volume of gas is discharged from the battery at a time, the retainer member and the air-permeable and liquid-impermeable filter are disengaged from periphery of the opening by the secure/detach means so that the opening is opened and the large volume of gas can be discharged to the external instantly. In water, even if water penetrates into the battery housing, the break of the battery housing is prevented and a safer product can be provided.

Further, since only the air-permeable and liquid-impermeable filter and the retainer member for holding it are required, a cost can be reduced.

What is claimed is:

1. A device usable in water, comprising:

a battery housing arranged in said device to house a battery;

said battery housing having a common wall shared by an outer wall of said device;

said common wall having an opening;

a valve urged by an urging member against said opening, said valve is opened by a difference between a pressure in said battery housing and a pressure external of said equipment; and an air-permeable and liquid-impermeable filter arranged in said battery housing to cover said opening.

2. A device according to claim 1, further comprising:

an elastic seal member arranged between said opening and said valve.

3. A device according to claim 1 wherein said common wall includes a removable lid, said valve and said air-permeable and liquid-impermeable filter being mounted on said lid.

4. A device according to claim 3 further comprising:

an electrode adapted for supplying power from the battery housed in said battery housing to an electric circuit even when said lid is removed to open said battery housing.

5. A device according to claim 1, further comprising an electrode extending through the battery housing so as to permit the battery to supply power external of the battery housing, the electrode being fitted to the battery housing so as to be airtight.

6. A battery housing as set forth in claim 5, wherein the amount of pressure required to open the valve is determined by pressure exerted externally of the battery housing.

7. A battery housing as set forth in claim 5, wherein the amount of pressure required to open the valve is determined by a pressure exerted by a biasing member in said valve.

* * * * *